(12) United States Patent
Matsuno

(10) Patent No.: US 7,922,203 B2
(45) Date of Patent: Apr. 12, 2011

(54) STEERING COLUMN SYSTEM

(75) Inventor: Mitsuyoshi Matsuno, Shizuoka (JP)

(73) Assignee: Fuji Kiko Co., Ltd., Kosai-shi, Shizuoka-ken (JP)

( * ) Notice: Subject to any disclaimer, the term of this patent is extended or adjusted under 35 U.S.C. 154(b) by 0 days.

(21) Appl. No.: 12/656,079

(22) Filed: Jan. 15, 2010

(65) Prior Publication Data
US 2010/0219624 A1  Sep. 2, 2010

(30) Foreign Application Priority Data

Feb. 27, 2009 (JP) .............................. P2009-046768

(51) Int. Cl.
*B62D 1/00* (2006.01)
(52) U.S. Cl. ....................................... 280/777; 280/779
(58) Field of Classification Search .................. 280/775, 280/777, 779
See application file for complete search history.

(56) References Cited

U.S. PATENT DOCUMENTS

| | | | |
|---|---|---|---|
| 6,378,903 B1 * | 4/2002 | Yabutsuka et al. ............. | 280/777 |
| 6,623,036 B2 * | 9/2003 | Yamamura et al. ............. | 280/775 |
| 6,799,779 B2 * | 10/2004 | Shibayama .................... | 280/777 |
| 7,090,250 B2 * | 8/2006 | Kinoshita et al. ............. | 280/775 |
| 7,367,589 B2 * | 5/2008 | Stuedemann et al. ........ | 280/777 |
| 7,393,014 B2 * | 7/2008 | Bechtel et al. ................ | 280/777 |
| 2003/0172765 A1 | 9/2003 | Heiml | |
| 2010/0301593 A1 * | 12/2010 | Sakata .......................... | 280/775 |

FOREIGN PATENT DOCUMENTS

| | | |
|---|---|---|
| EP | 0 836 981 A1 | 4/1998 |
| GB | 2 365 826 A | 2/2002 |
| JP | 10-157634 A | 6/1998 |
| JP | 10-250601 | 9/1998 |
| JP | 2005-138825 | 6/2005 |
| WO | 03035452 A1 | 5/2003 |

OTHER PUBLICATIONS

Search Report of the Counterpart European Application, issued Oct. 20, 2010, five (5) pages.

* cited by examiner

*Primary Examiner* — Toan C To
(74) *Attorney, Agent, or Firm* — The Nath Law Group; Jerald L. Meyer; Derek Richmond

(57) ABSTRACT

Provided is a steering column system capable of firmly holding a jacket during a normal condition and securing a larger movement stroke for the jacket when an excessive impact force is applied. To this end, when a clamp bolt (72) is fastened, sliding contact portions (70*a*) are pressed to abutment parts (43), respectively. Thus, a jacket (3) is firmly clamped to and held by a mount bracket (6). When a force in excess of a predetermined value is applied to the jacket (3) in its axial direction, shear portions (74*b*) break, and thereby a restraint imposed on a movement range by restraint portions (74*a*) is lifted. This contracts the jacket (3).

5 Claims, 17 Drawing Sheets

STEERING COLUMN SYSTEM

TECHNICAL FIELD

The present invention relates to a steering column system which secures a larger movement stroke of a jacket when an excessive impact force in excess of a predetermined value is applied to the jacket.

BACKGROUND ART

A proposal has been made on a steering column system including: a jacket configured to rotatably support a steering shaft; a lock mechanism configured to adjust this jacket in the longitudinal direction and in tilt; a breakable member configured to enable the jacket to move in its axial direction when an excessive impact force in excess of a predetermined value is applied to the jacket (see Patent Literature 1, for instance).

As shown in FIG. 1, this steering column system 100 includes: a steering shaft 101 having a steering wheel (not illustrated) fixed to an axially uppermost end; a jacket 102 configured to rotatably support this steering shaft 101; a guide member 103 configured to guide this jacket 102; and a lock mechanism 104 configured to lock the jacket 102 to the guide member 103. The lock mechanism 104 chiefly includes: paired tooth part 105 and tooth part 106, the tooth part 106 provided in the inside of the jacket 102 and the tooth part 105 provided in a telescopic long hole 110 of the jacket 102; a clamp member 108 including a bolt 107 whose head portion 107a is connected to the moving-side tooth part 106; and an operation lever 109 for operating this clamp member 108. The bolt 107 has a neck portion 107b situated between the jacket 102 and the guide member 103.

In the case of the foregoing configuration, once the operation lever 109 is rotated in an unlocking direction, the bolt 107 moves toward the steering shaft 101, and the paired tooth parts 105 and 106 are accordingly unmeshed from each other. This makes the jacket 102 capable of moving in its axial direction. On the contrary, once the operation lever 109 is rotated in a locking direction, the bolt 107 moves in a direction away from the steering shaft 101, and the paired tooth parts 105 and 106 accordingly mesh together. For this reason, the jacket 102 is locked to the guide member 103, and is accordingly inhibited from moving in its axial direction. At this time, if an excessive axial impact force in excess of a predetermined value is applied to the jacket 102 through the steering shaft 101 due to reasons such that a driver is hit against the steering wheel in a vehicle collision, the bolt 107 receives a shearing force, and accordingly breaks at the neck portion 107b. Thus, the head portion 107a is detached from the bolt 107. This makes the steering shaft 101 and the jacket 102 capable of moving in their axial directions.

Another steering column system 120, which is shown in FIG. 2 includes: paired separable members 121, 122; a moving-side tooth part 106 provided in the separable member 121; a fixed-side tooth part 105 provided in a telescopic long hole 110; and a shear pin 123 which extends along the bolt 107, and which connects the separable members 121, 122.

In the case of the foregoing configuration, if an excessive axial impact force in excess of a predetermined value is applied to the jacket 102 through the steering shaft 101 while the jacket 102 is being locked by the paired tooth parts 105 and 106 being in mesh, the shear pin 123 breaks due to the shearing force. Accordingly, the separable member 121 is detached from the separable member 122. This makes the steering shaft 101 and the jacket 102 capable of moving in their axial directions.

[Citation List]
[Patent Literature]
Patent Literature 1: Japanese Patent Application Laid-Open No. Hei.-10-157634.

SUMMARY OF INVENTION

Technical Problems

In the case of the configuration shown in FIG. 1 according to the technique as recited in Patent Literature 1, the impact force which enables the steering shaft 101 and the jacket 102 to move in the their axial directions is determined by the provision of the neck portion 107b in the bolt 107 of the clamp member 108. For this reason, if the steering column system is intended to be inhibited from being loosened in a normal operating condition of the vehicle by increasing a clamping force applied by the bolt 107 and making the moving-side tooth part 106 and the fixed-side tooth part 105 firmly engage together, the neck portion 107b is likely to break due to lack of the strength. On the contrary, if the neck portion 107b is increased in diameter to withstand a larger clamping force, it becomes difficult for the neck portion 107b to break when the excessive axial impact force in excess of the predetermined value is applied to the jacket 102 through the steering shaft 101. Accordingly, the steering shaft 101 and the jacket 102 are prevented from moving in their axial directions. In short, the magnitude of the impact force determined by the neck portion 107b and the quantity of the clamping force which needs to be applied by the bolt 107 to inhibit the steering column system from being loosened are incompatible demands. It is very difficult to reconcile the two demands.

In the configuration shown in FIG. 2, the fixed-side tooth part 105 has such a structure as to be integral with an edge portion of the telescopic long hole 102a of the jacket 102. Here, after the shear pin 123 breaks due to a shear force and the separable member 121 is detached from the separable member 122, the movement stroke of the bolt 107 is limited to a stroke until the bolt 107 abuts on the edge portion of the telescopic long hole 102a. As a result, the bolt 107 is incapable of securing a sufficient movement stroke. On the contrary, in a case where an end portion of the telescopic long hole 102a is opened by elongating the telescopic long hole 102a in the same direction as the movement of the bolt 107 for the purpose of securing a sufficiently long stroke, the bolt 107 is incapable of restraining the telescopic range (axial position adjustment range) of the jacket 102. For this reason, a restraint member needs to be additionally provided to the configuration.

Solution to Problems

With the above-described problems taken into consideration, an object of the present invention is to provide a steering column system capable of: rigidly holding a jacket rotatably supporting a steering shaft during its normal operation; and securing a larger movement stroke of the jacket when an excessive impact force in excess of a predetermined value is applied to the jacket.

A first aspect of the present invention is a steering column system including: a mount bracket including a fixed portion and a suspended portion, the fixed portion fixed to a vehicle body, the suspended portion united with the fixed portion; a steering shaft having a steering wheel fixed to an axially uppermost end thereof; a jacket configured to rotatably support the steering shaft; a jacket bracket which is integrally formed on an outer peripheral surface of the jacket and which includes a sliding contact portion and a slit, the sliding contact portion extending in an axial direction of the jacket, the slit formed so as to extend in the axial direction of the jacket and to be opened toward a rear of the vehicle body; a jacket guide placed between the mount bracket and the jacket, the jacket guide including an abutment part which is opposed to and abuts on the sliding contact portion; a clamp bolt which is supported by the mount bracket and which includes a shaft portion, the shaft portion penetrating the slit of the jacket bracket and the jacket guide; and a detachment member including a restraint portion and a shear portion, the restraint portion being placed in such a way as to lie across the slit to restrain a movement range of the clamp bolt in the slit, the shear portion configured to fix the restraint portion to the jacket bracket and to be released from their connection when a force in excess of a predetermined value is applied, in which, when the clamp bolt is fastened, the sliding contact portion is pressed to the abutment part, and the jacket is firmly clamped to and held by the mount bracket, and when the force in excess of the predetermined value is applied to the jacket in its axial direction while the clamp bolt is being fastened, the shear portion breaks, and thereby the restraint imposed on the movement range by the restraint portion is lifted, and the jacket moves.

A second aspect of the present invention is the steering column system according to the first aspect characterized in that the abutment part has a square U-shaped groove cross section, which extend in the axial direction, and movement of the jacket is guided in the axial direction by causing the jacket bracket to slide in a square U-shaped groove between the abutment parts.

A third aspect of the present invention is the steering column system according to the first or the second aspect characterized in that the detachment member includes a guide plate made of resin and a holding plate made of a plate-shaped member, the shear portion includes a shear pin which juts out from the guide plate and which penetrates a bracket-side connection hole and a holding plate-side connection hole, the bracket-side connection hole being a through-hole formed in the jacket bracket, and the holding plate-side connection hole being formed in the holding plate, and the restraint portion includes long holes which are respectively formed in the holding plate and the guide plate and which have a lengthwise dimension equal to a telescopic movement dimension of the jacket.

A fourth aspect of the present invention is the steering column system according to any one of the first to third aspect characterized in that the detachment member includes: a mesh piece including an insertion hole in which the shaft portion of the clamp bolt is inserted, a moving-side tooth part including a plurality of tooth-shaped protrusions being arranged in parallel like a rack, the plurality of tooth-shaped protrusions extending toward the guide plate, and biasing means which is made of an elastic material and which juts out toward the main body part; and a fixed-side tooth part including a plurality of tooth-shaped protrusions arranged in parallel like a rack on the guide plate along the long hole in the guide plate, the fixed-side tooth part being configured to be capable of meshing with the moving-side tooth part, when the clamp bolt is fastened, the fixed-side tooth part and the moving-side tooth part mesh with each other; and when the clamp bolt is unfastened, biasing force of the biasing means make the fixed-side tooth part and the moving-side tooth part separated away from each other.

A fifth aspect of the present invention is the steering column system according to any one of the first to fourth aspect characterized in that the jacket guide comprises a rolled-in support portion which juts out in the axial direction of the jacket from an outer edge of the abutment part toward an outer edge of the sliding contact portion, and which is rolled toward a back side of the sliding contact portion in the contracted jacket.

Advantageous Effects of Invention

In the first aspect of the present invention, when the clamp bolt is fastened, the abutment part of the jacket guide is engaged with the sliding contact portion by pressure contact. Thus, the jacket is firmly clamped to and held by the mount bracket. This inhibits the movements of the jacket bracket and the jacket, respectively. On the contrary, when the clamp bolt is unfastened, the abutment part and the sliding contact portion are released from their pressure contact and engagement. This makes the jacket bracket and the jacket capable of moving. When the excessive impact force in excess of the predetermined value is applied to the jacket in its axial direction through the steering shaft while the clamp bolt is being fastened, the jacket bracket moves, and the clamp bolt accordingly hits the restraint portion. Thus, the shear portion breaks, and the detachment member is detached from the jacket bracket. This undoes the clamping and firm holding of the jacket bracket to the jacket guide which is achieved by the pressure contact, and accordingly makes the jacket capable of moving in the axial direction.

This configuration makes the tensile strength of the clamp bolt larger than the configuration according to the conventional example in which the neck portion is formed in the shaft portion of the clamp bolt. For this reason, the clamp bolt is capable of causing the jacket bracket to be firmly engaged with the mount bracket by pressure contact, and thereby the jacket bracket is clamped to and firmly held by the mount bracket.

The clamping force applied by the clamp bolt is received by the pressure contact between the sliding contact portion of the jacket bracket and the abutment part of the jacket. For this reason, the clamping force received by the detachment member need not be large. This makes it possible to set a detachment load characteristic for the detachment member depending on the necessity.

Furthermore, the jacket bracket includes the slit which extends in the axial direction of the jacket, and which is opened toward the rear of the vehicle body. For this reason, when the excessive impact force in excess of the predetermined value is applied, the jacket moves along the slit of the jacket bracket in the axial direction of the jacket. This makes it possible to secure a larger movement stroke for the jacket.

In the second aspect of the present invention, the jacket bracket slides in the square U-shaped groove between the abutment parts under the guidance of the groove. This makes it possible to prevent the jacket from getting stuck and coming off while the jacket is moving in the axial direction.

In the third aspect of the present invention, the jacket moves along the long hole of the jacket bracket when the jacket moves telescopically, and the jacket is inhibited from moving when the clamp bolt comes to abut on the end portions of the long holes (restraint portion) respectively of the holding plate and the guide plate of the detachment member. On the other hand, when the clamp bolt hits the end portions of the long holes respectively of the holding plate and the guide plate due to the excessive impact force in excess of the predetermined value which is applied to the jacket, the shear pin break, and the jacket is detached from the holding plate and the guide plate.

In the fourth aspect of the present invention, the moving-side tooth part of the mesh piece, in which the shaft portion of the clamp bolt is inserted, meshes the fixed-side tooth part of the guide plate. Thus, the jacket guide and the guide plate do not slip on each other. This enables the shear pin to securely break with a detachment load characteristic determined beforehand. In addition, when the clamp bolt is unfastened, the biasing force of the biasing means makes the fixed-side tooth part and the moving-side tooth part separated away from each other, and thereby the moving-side tooth part and the fixed-side tooth part are completely unmeshed from each other. For this reason, it is possible to prevent the jacket from getting stuck while the jacket is moving in the axial direction.

In the fifth aspect of the present invention, the rolled-in support portion juts out from the outer edge of the abutment part to the outer edge of the sliding contact portion, while extending in the axial direction of the jacket. In addition, the rolled-in-support portion is rolled toward the back side of the sliding contact portion in the contracted jacket. This makes it possible to hold the jacket bracket in such a way that the jacket bracket is capable of moving in the axial direction of the jacket, and thereby makes it possible to prevent the jacket from coming off.

BRIEF DESCRIPTION OF DRAWINGS

FIG. 4A is the longitudinal sectional view showing a state where a steering shaft is extended. FIG. 4B is the longitudinal sectional view showing a state where a detachment capsule is detached.

FIG. 15A is the longitudinal sectional view showing a state where a steering shaft is extended. FIG. 15B is the longitudinal sectional view showing a state where a detachment capsule is detached.

FIG. 20A is a front view. FIG. 20B is a side view.

DESCRIPTION OF EMBODIMENTS

Figure 1:
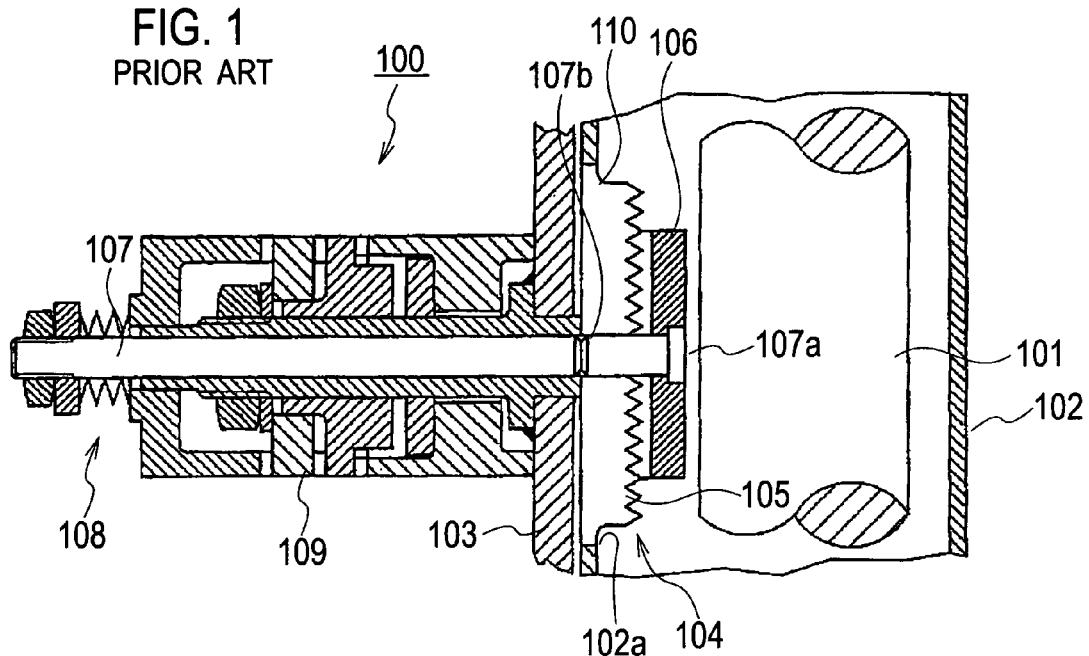
FIG. 1 is a cross-sectional view showing a conventional example of a steering column system.
Figure 2:
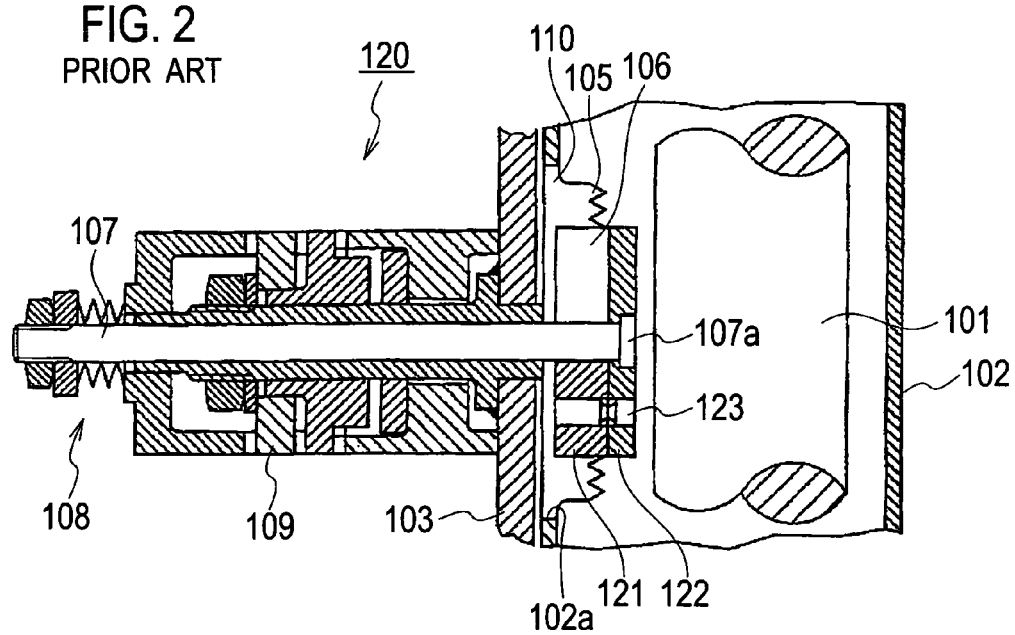
FIG. 2 is a cross-sectional view showing another conventional example of a steering column system.

Descriptions will be hereinbelow provided for embodiments of the present invention, referring to the drawings. Like members are designated by like reference characters. Note that, for explanatory convenience, a jacket guide and a mount bracket are indicated by chain double-dashed lines in FIG. 3, as well as the jacket guide, the mount bracket and a tilt bracket are indicated by chain double-dashed lines in FIGS. 4A and 4B.

Figure 3:
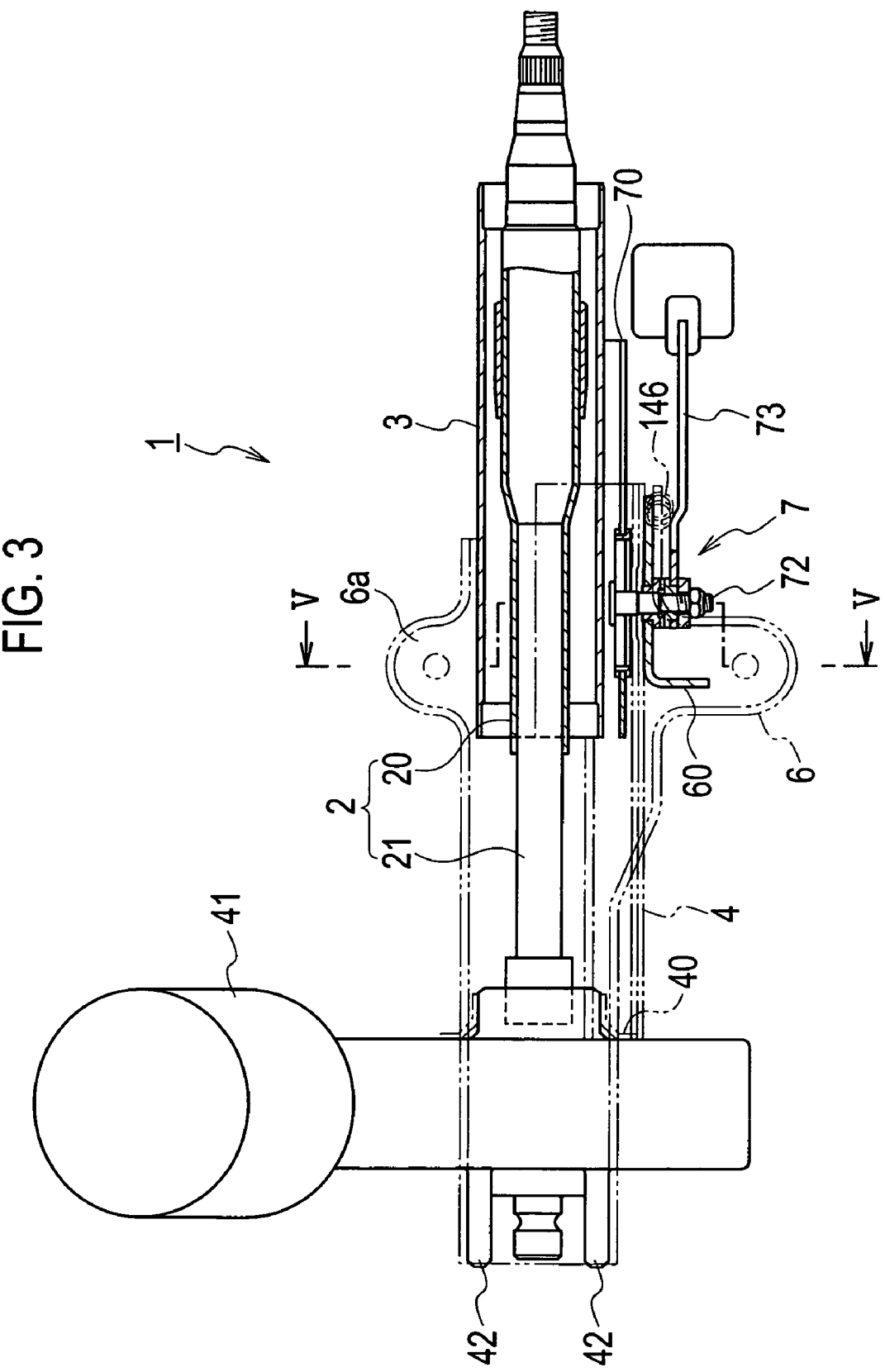
FIG. 3 shows a first embodiment of the invention, and is a transverse sectional view of a steering column system.
Figures 4A, 4B:
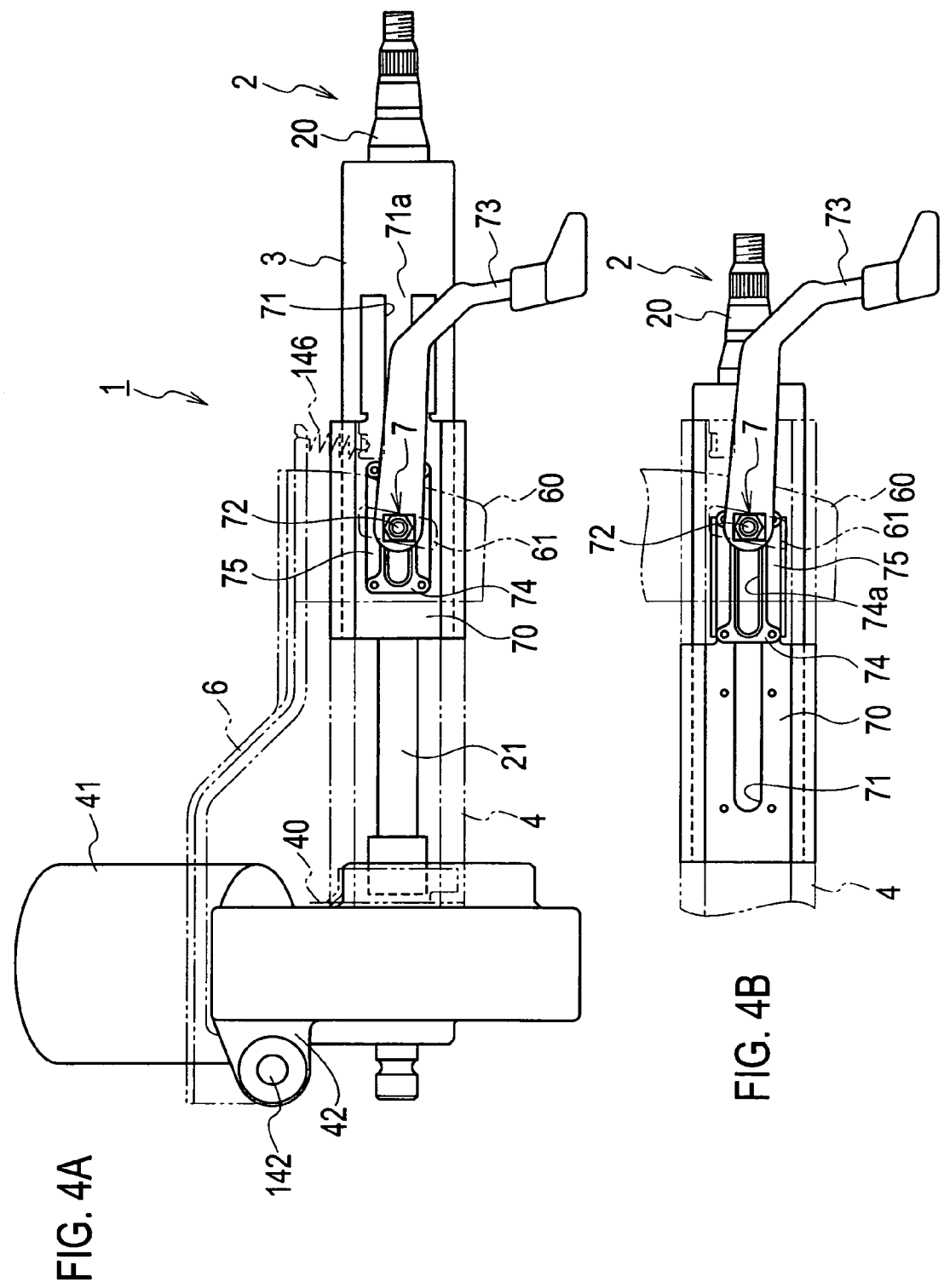
FIGS. 4A and 4B show the first embodiment of the invention, and are longitudinal sectional views of the steering column system.
Figure 5:
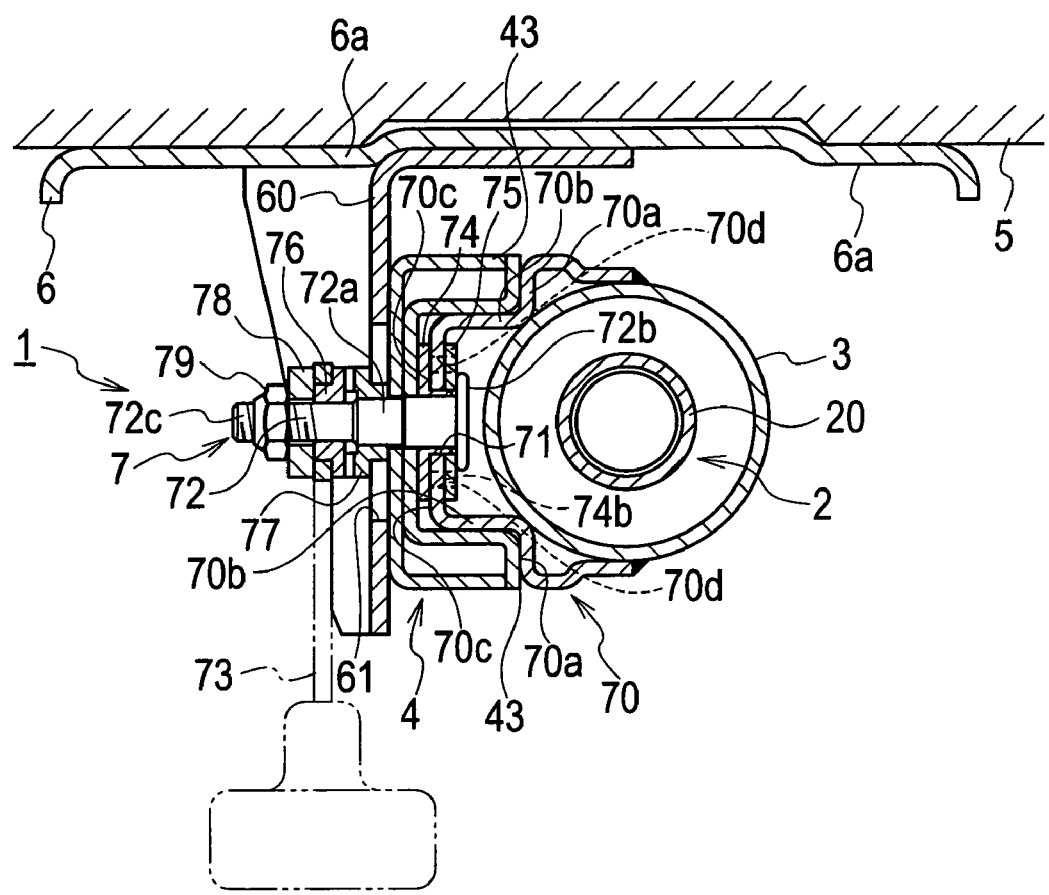
FIG. 5 shows the first embodiment of the invention, and is a cross-sectional view taken along the V-V line of FIG. 3.
Figure 6:
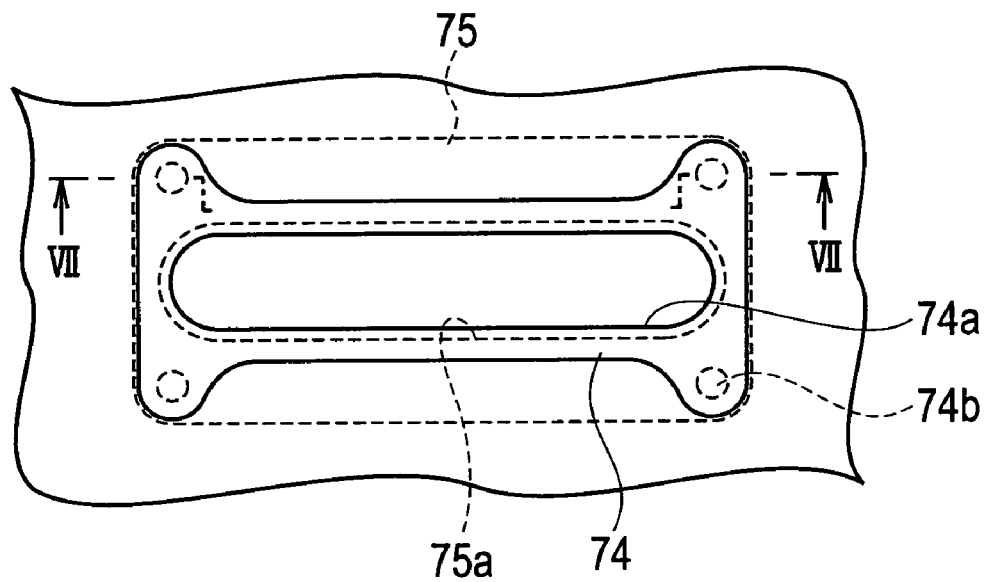
FIG. 6 shows the first embodiment of the invention, and is a front view showing how a guide plate and the holding plate are attached to each other.
Figure 7:
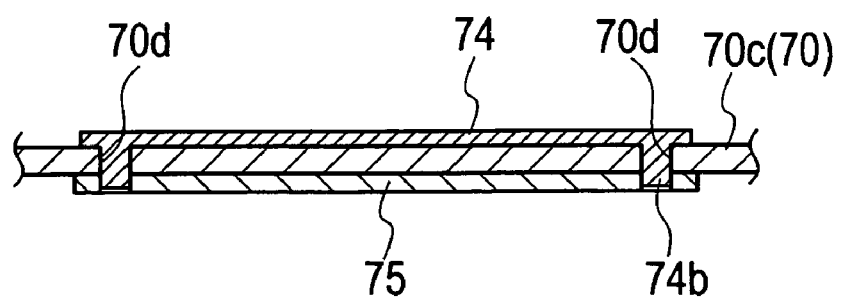
FIG. 7 shows the first embodiment of the invention, and is a cross-sectional view taken along the line of FIG. 6.
Figure 8:
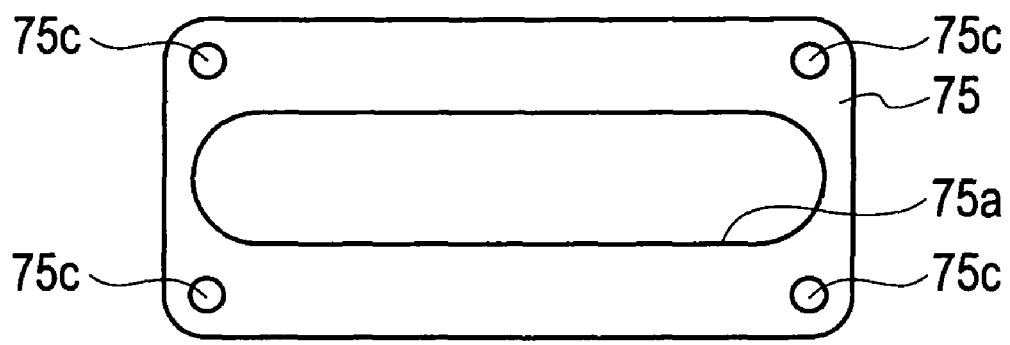
FIG. 8 shows the first embodiment of the invention, and is a front view of the holding plate.
Figure 9:
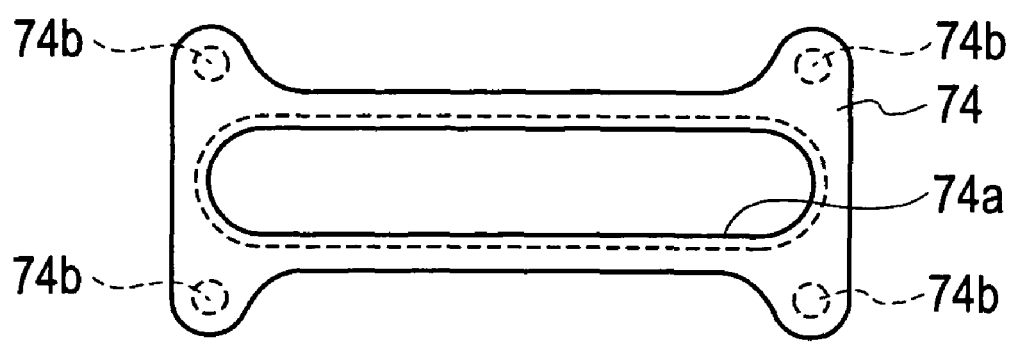
FIG. 9 shows the first embodiment of the invention, and is a front view of the guide plate.

As shown in FIGS. 3 to 5, a steering column system 1 according to a first embodiment includes: a jacket 3 configured to movably support a steering shaft 2 which has a steering wheel (not illustrated) attached to its axially uppermost end (a rightmost end in FIG. 3); a jacket guide 4 configured to guiding this jacket 3; a mount bracket 6 fixed to a vehicle body 5; and a lock mechanism 7 configured to lock the jacket 3 to the jacket guide 4.

The steering shaft 2 includes an upper shaft 20 and a lower shaft 21, which are fitted together so as to be slideable relative to each other in their axial direction.

Figure 13:
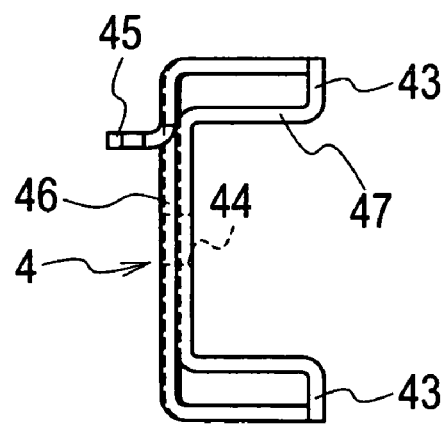
FIG. 13 shows the first embodiment of the invention, and is a side view of the jacket guide.
Figure 14:
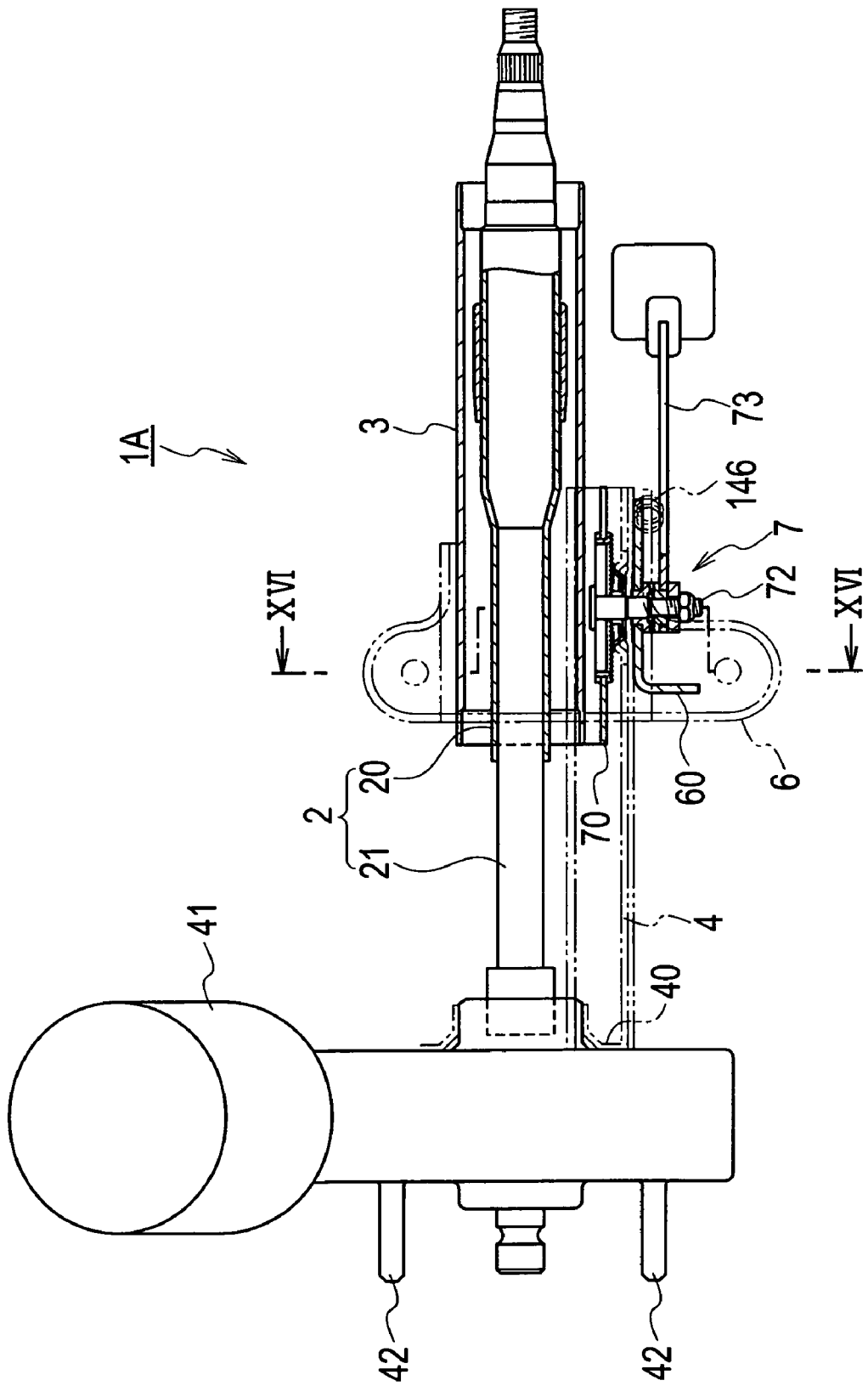
FIG. 14 shows a second embodiment of the invention, and is a transverse sectional view of a steering column system.
Figure 15:
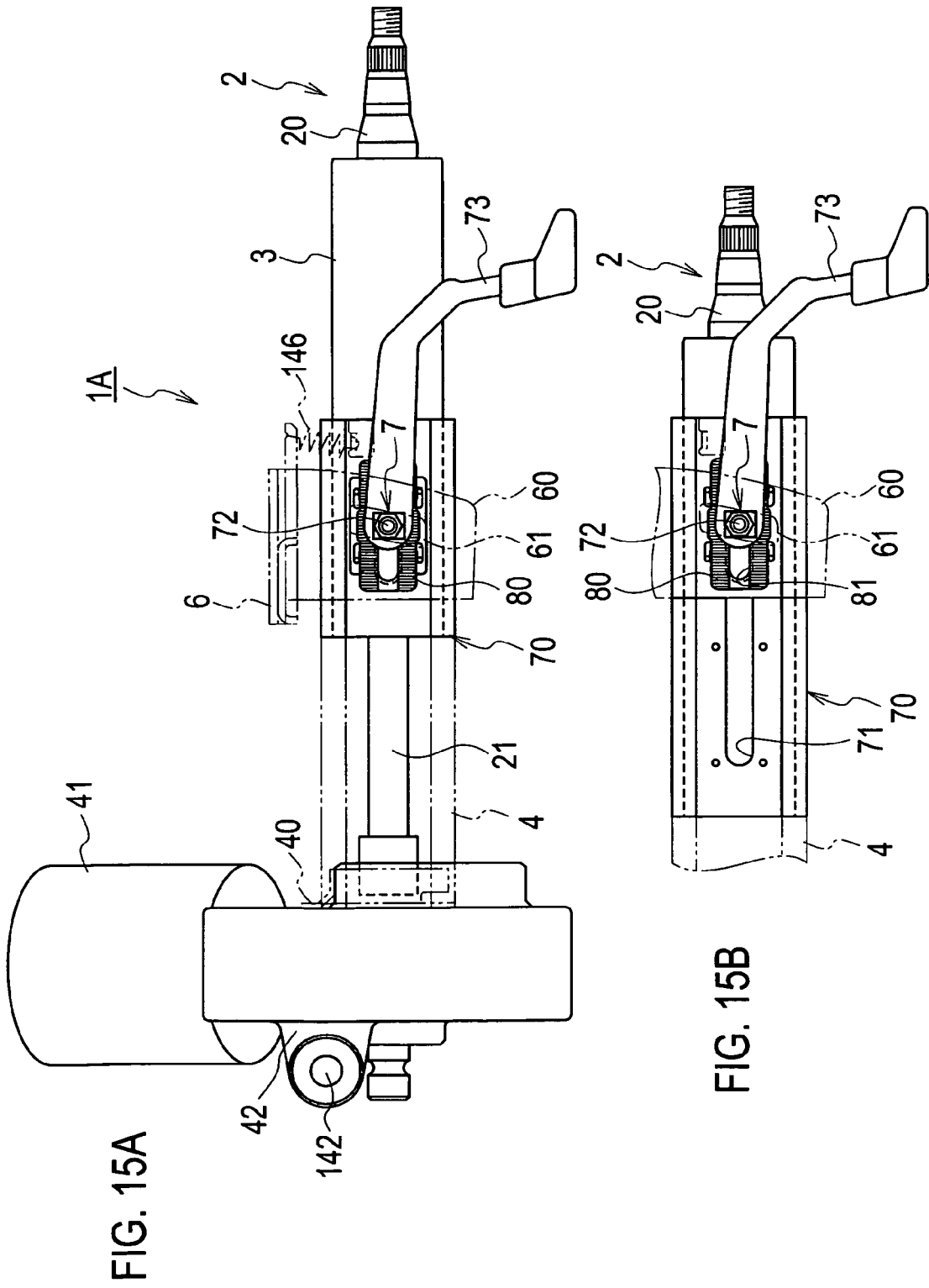
FIGS. 15A and 15B show the second embodiment of the invention, and are longitudinal sectional views of the steering column system.

The jacket guide 4 is installed in a manner extending in the same direction as the steering shaft 2 and the jacket 3 extends. A longitudinal lowermost end portion 40 of the jacket guide 4 is connected to a lower support bracket 42 with an electric power steering apparatus 41 in between, and the jacket guide 4 is accordingly supported by the vehicle body 5 via a tilt shaft 142. This makes the jacket guide 4 and jacket 3 as a whole capable of rotating about the tilt shaft 142. In addition, as shown in FIG. 13, the jacket guide 4 has an almost square U-shaped cross section which is formed by including: a sliding contact member 46 configured to be brought into sliding contact with a tilt bracket 60 of the mount bracket 6; and a guide member 47 configured to guide a jacket bracket 70, which will be described later. Abutment parts 43 are respectively provided in front ends of the guide member 47 which extends in the axial direction. The abutment parts 43 are configured to be brought into contact with sliding contact portions 70a of the jacket bracket 70 described later. Furthermore, a round hole 44 is made in the jacket guide 4. A clamp bolt 72 described later is inserted in the round hole 44. A protrusion piece 45 is provided in a longitudinal upper end of the jacket guide 4. The jacket guide 4 is suspended from the mount bracket 6 while biased upwardly by a spring member 146 which is stretchedly installed between the protrusion piece 45 and the mount bracket 6.

In the mount bracket 6, the tilt bracket (suspended part) 60, which is suspended from a fixed portion 6a fixed to the vehicle body, is hung downward. The tilt bracket 60 includes a tilt long hole 61 which extends in the vertical direction of the vehicle, and which is shaped like an arc. The tilt bracket 60 abuts on the jacket guide 4.

The lock mechanism 7 includes: the jacket bracket 70 which is welded to the jacket 3, and which extends in the axial direction of the jacket 3; the clamp bolt 72 including a shaft portion 72a which is rotatably supported by the jacket guide 4 and a slit 71 formed in the jacket bracket 70; and an operation lever 73 configured to operate the clamp bolt 72.

Figure 10:
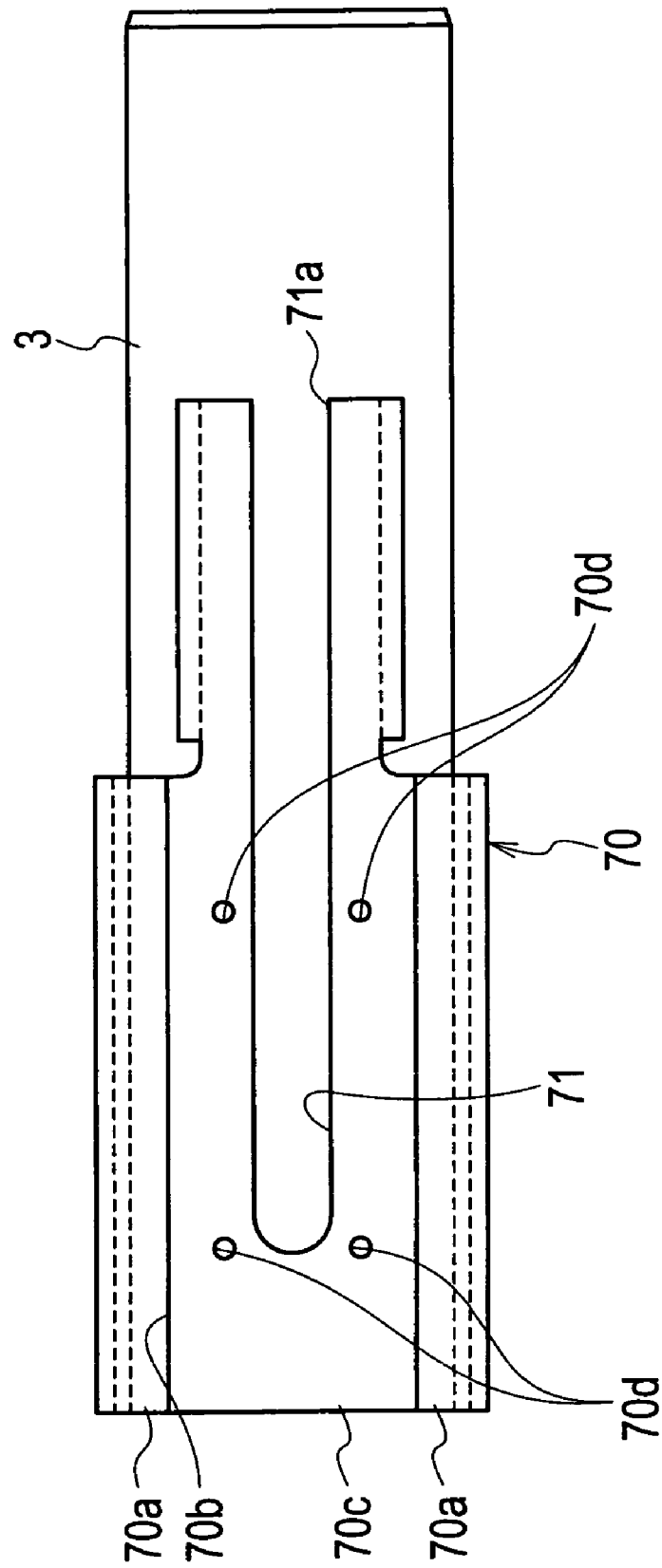
FIG. 10 shows the first embodiment of the invention, and is a front view of a jacket and a jacket bracket.
Figure 11:
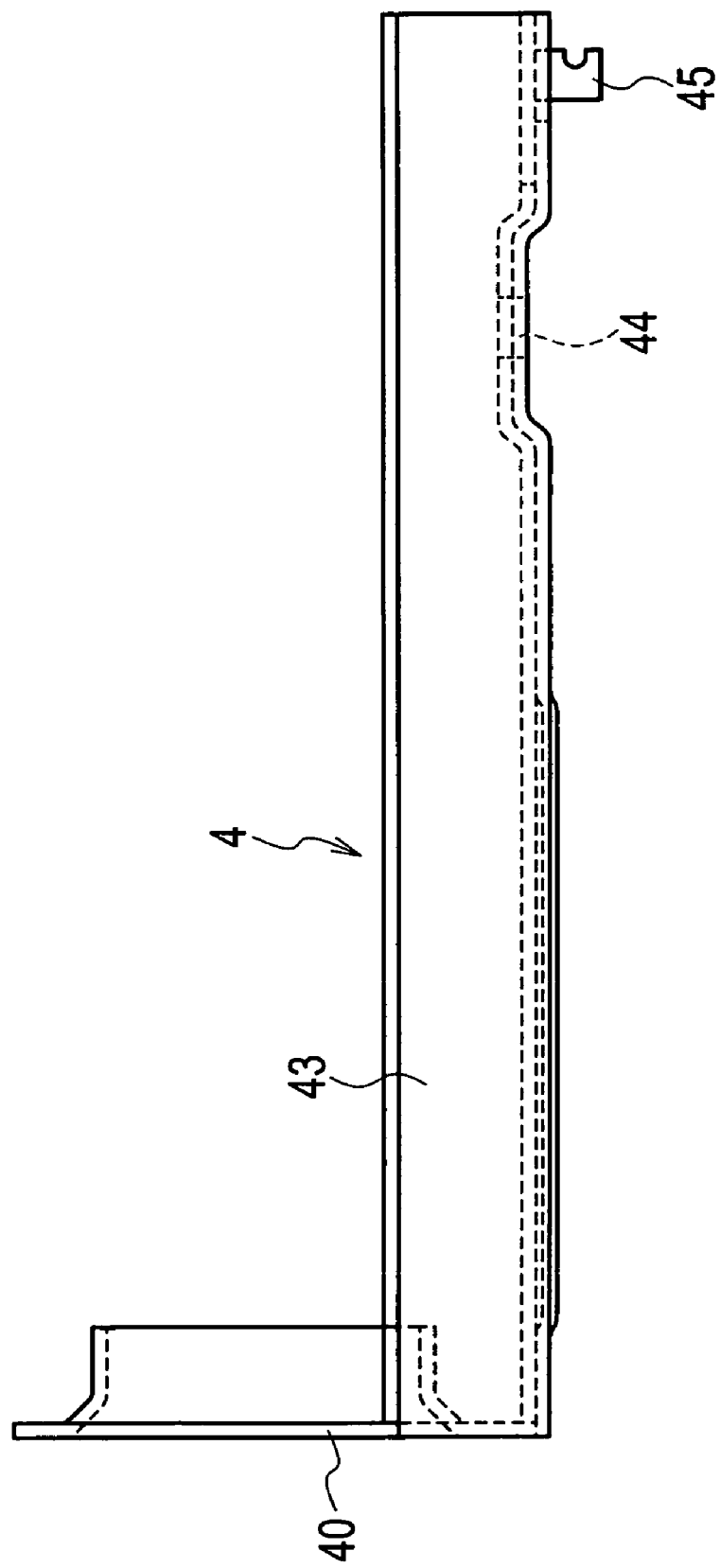
FIG. 11 shows the first embodiment of the invention, and is a plan view of a jacket guide.
Figure 12:
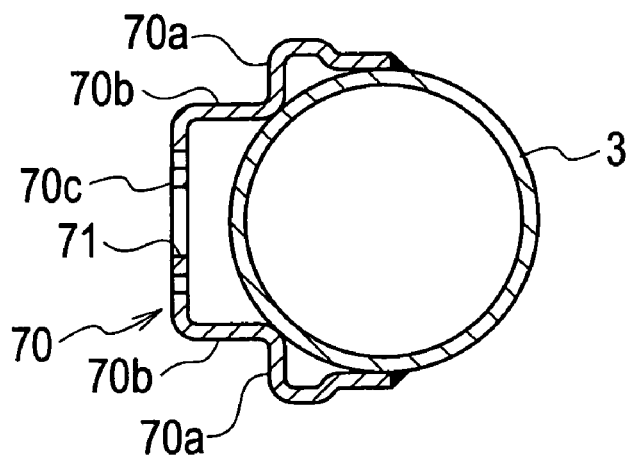
FIG. 12 is a cross-sectional view showing the first embodiment of the invention.

The jacket bracket 70 includes: paired sliding contact portions 70a which are placed near the jacket 3, and which are opposed to the jacket guide 4; flat portions 70b which are both installed between these sliding contact portions 70a, and which are in sliding contact with the jacket guide 4 while being placed in a square U-shaped groove between the abutment parts 43 with a predetermined gap between each flat portion 70b and the jacket 3; and a sidewall portion 70c in which the slit 71 is formed, the slit 71 extending in the axial direction as shown in FIG. 10. The jacket 3 is moveable in the axial direction while being guided by the jacket guide 4 in a state where the ends of the abutment parts 43 of the jacket guide 4 abut on the paired sliding contact portions 70a, respectively, and where the two end portions of the flat portions 70b are interposed between the abutment parts 43. In addition, the paired sliding contact portions 70a are provided from the axially lowermost end to a middle portion of the jacket 3. The sidewall portion 70c is provided so as to be longer toward the axially uppermost end than the sliding contact portions 70a. The slit 71 formed in the sidewall portion 70c is closed in its axially lower end, and an opening 71a is formed in the axially uppermost end of the slit 71 in a manner directed toward the rear of the vehicle body.

A detachment capsule as a detachment member is attached to a vicinity of the axially lowermost end of the slit 71, the detachment capsule including a resin guide plate 74 and a holding plate 75 as shown in FIGS. 6 to 9. Long holes (restraint portion) 74a, 75a are respectively provided to the guide plate 74 and the holding plate 75. The long holes 74a, 75a are arranged in such a way that: the long holes 74a, 75a are opposed to the slit 71; the clamp bolt 72 is inserted in the long holes 74a, 75a; the long holes 74a, 75a have a lengthwise dimension which is equal to telescopic movement dimensions respectively of the steering shaft 2 and the jacket 3; and end portions of each of the long holes 74a, 75a lie across the slit 71. Four shear pins (shear portion) 74b formed integral with the guide plate 74 penetrate bracket-side connection holes 70d which are through-holes formed in the jacket bracket 70, and their front-ends are locked in holding plate-side connection holes 75c formed in the holding plate 75, respectively. The holding plate 75 is placed inside the sidewall portion 70c (closer to the jacket 3), and abuts on the head portion 72b of the clamp bolt 72. The guide plate 74 is installed between the sidewall portion 70c and the jacket guide 4. In addition, a minute gap is provided between the guide plate 74 and the jacket guide 4.

Furthermore, the shaft portion 72a of the clamp bolt 72 is inserted in: a movable cam 76 attached to the operation lever 73; a fixed cam 77 installed between the movable cam 76 and the tilt bracket 60; and a needle bearing 78. The needle bearing 78 is pressed in the axial direction by a nut 79 screwed to a front end 72c of the clamp bolt 72.

In the case of the foregoing configuration, once a driver of the vehicle fastens (locks) the clamp bolt 72 by rotating the operation lever 73 in the locking direction, the head portion 72b of the clamp bolt 72 moves away from the jacket 3, and is brought into pressure contact with the holding plate 75. Accordingly, the jacket bracket 70 is clamped to, and firmly held (locked) by, the jacket guide 4 and the tilt bracket 60. This restrains the vertical (tilt) and axial (telescopic) movement of the jacket 3. On the contrary, once the driver unfastens (unlocks) the clamp bolt 72 by rotating the operation lever 73 in the unlocking direction, the head portion 72b of the clamp bolt 72 moves toward the jacket 3. Thus, the jacket bracket 70 is unclamped and released from the jacket guide 4. This release makes the jacket 3 capable of moving in the vertical (tilt) direction and in the axial (telescopic) direction.

Assume a case where, an excessive axial impact force in excess of a predetermined value is applied to the jacket 3 through the steering shaft 2 while the lock mechanism 7 is in a locked state, due to reasons such that the driver is hit against the steering wheel in a vehicle collision. In this case, the steering shaft 2 and the jacket 3 move along their respective axes toward the front of the vehicle body. Thereby, the clamp bolt 72 hits the long hole 74a of the guide plate 74 and the long hole 75a of the holding plate 75 at their respective edge portions closer to the rear of the vehicle body. Thereafter, the shear pins 74b of the guide plate 74 break due to the shear force. Accordingly, the guide plate 74 and the holding plate 75 come off the jacket bracket 70, whereas the clamp bolt 72 remains in the slit 71 of the jacket bracket 70. Thereby, the jacket bracket 70 is unclamped and released from the jacket guide 4. This makes the steering shaft 2 and the jacket 3 capable of moving in their axial directions. Thus, the steering shaft 2 and the jacket 3 contract and thus absorb the impact energy with their unillustrated energy-absorbing structures.

The tensile strength of the clamp bolt 72 according to the first embodiment can be made larger than that of the clamp bolt 72 according to the conventional example which has a neck portion in its shaft portion. For this reason, the clamp bolt 72 is capable of clamping and firmly holding the jacket bracket 70 to the jacket guide 4 and the tilt bracket 60 with the jacket bracket 70 being firmly engaged with the jacket guide 4 and the tilt bracket 60 by pressure contact.

According to the first embodiment, once an excessive axial impact force in excess of a predetermined value is applied to the jacket 3, the guide plate 74 and the holding plate 75 come off the jacket bracket 70. This makes the jacket 3 and the jacket bracket 70 capable of moving toward their axially lowermost ends as shown in FIG. 4B, and concurrently makes the clamp bolt 72 capable of moving along the slit 71 of the jacket bracket 70 toward the axially uppermost end of the slit 71. For this reason, a larger movement stroke can be secured for the jacket 3. In addition, the jacket 3 can be prevented from coming off the tilt bracket 60 when the jacket 3 moves toward its axially lowermost end relative to the tilt bracket 60, because the clamp bolt 72 remains in the slit 71.

According to the first embodiment, the clamping force of clamp bolt 72 is received by the sliding contact portions 70a of the jacket bracket 70 and the abutment parts 43 of the jacket guide 4, and the minute gap is formed between the guide plate 74 of the detachment capsule and the jacket guide 4. Due to this structure, when the clamp bolt 72 is fastened, the clamping force of the clamp bolt 72 does not act on the detachment capsule, because the detachment capsule is not squeezed between the jacket bracket 70 and the jacket guide 4. Accordingly, the guide plate 74 can be set to have a detachment load characteristic depending on the necessity without being influenced by the clamping force of the clamp bolt when the guide plate 74 is attached to the vehicle body 5.

FIGS. 14 to 25 show a second embodiment of the present invention. Note that, for explanatory convenience, a jacket guide and a mount bracket are indicated by chain double-dashed lines in FIG. 14, as well as the jacket guide, the mount bracket and a tilt bracket are indicated by chain double-dashed lines in FIG. 15. In addition, in FIGS. 14 to 25, components which are the same as those shown in FIGS. 3 to 13 described above are denoted by the same reference signs.

Figure 16:
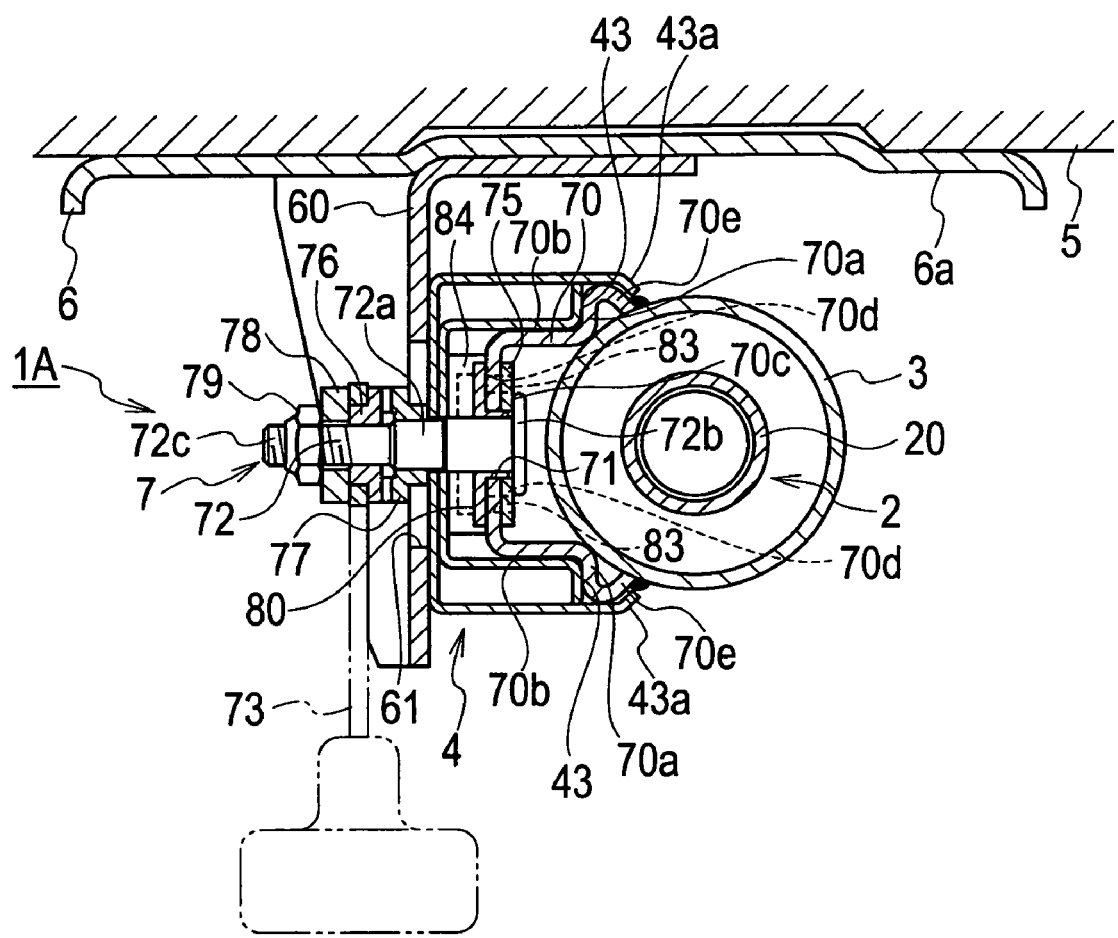
FIG. 16 shows the second embodiment of the invention, and is a cross-sectional view taken along the XVI-XVI line of FIG. 14.

In a steering column system 1A according to the second embodiment, as shown in FIG. 16, rolled-in support portions 43a jut out from outer edges of the paired abutment parts 43 of the jacket guide 4 toward the jacket 3, respectively. The rolled-in support portions 43a are rolled in from two sides in the direction parallel to the shorter edges of the jacket guide 4 toward back sides of outer edges 70e of the sliding contact portions 70a of the jacket bracket 70. Thereby, the jacket bracket 70 is held by the jacket guide 4 in a manner moveable in the axial direction. The rolled-in support portions 43a are provided from the longitudinal lowermost end portion 40 of the jacket guide 4 to a vicinity of the tilt bracket 60.

Figure 18:
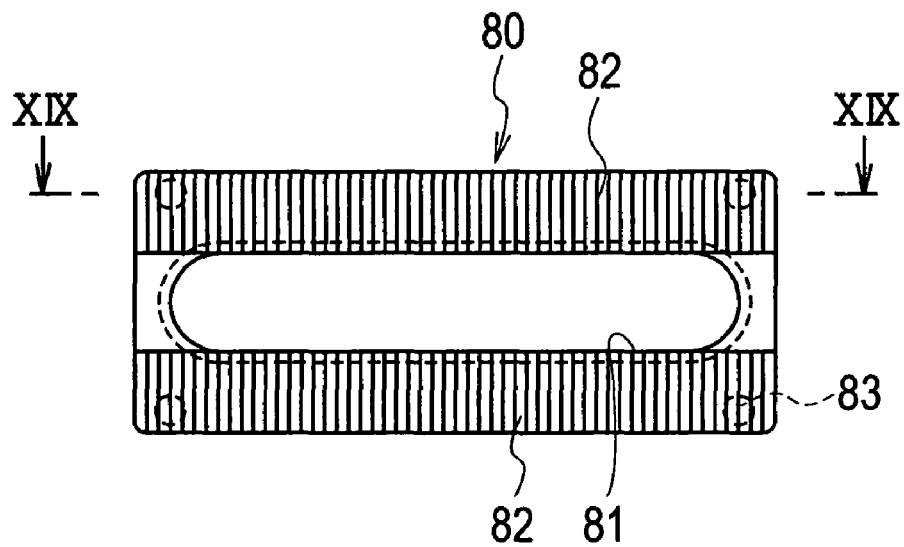
FIG. 18 shows the second embodiment of the invention, and is a front view of fixed-side tooth parts.
Figure 19:
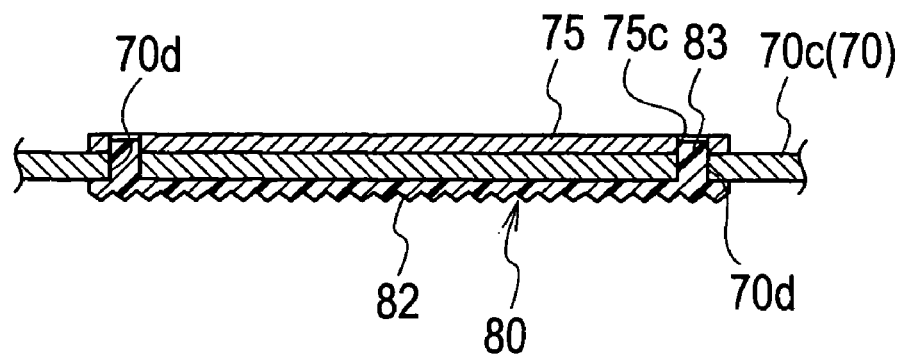
FIG. 19 shows the second embodiment of the invention, and is a cross-sectional view taken along the XIX-XIX line of FIG. 18.

Moreover, a detachment capsule is installed in the slit 71 of the jacket bracket 70. As shown in FIGS. 18 and 19, the detachment capsule includes a guide plate (main body) 80, the holding plate 75 and a mesh piece 84. The guide plate 80 is made of a resin material shaped like a long plate. A long hole (restraint part) 81 in which the clamp bolt 72 is inserted is made in the guide plate 80 in such a way as to be opposed to the slit 71 of the jacket bracket 70. The long hole 81 has a lengthwise dimension which is equal to the telescopic movement dimension of the steering shaft 2 and the jacket 3. Fixed-side tooth parts 82 are arranged in parallel on the front surface of the guide plate 80 in the axial direction of the jacket 3. Like a rack, each tooth part 82 includes multiple tooth-shaped protrusions. The multiple tooth-protrusions extend in a direction orthogonal to the axial direction of the jacket 3. In addition, four shear pins (shear portions) 83 are integrally formed in the respective four corners on the back surface of the guide plate 80. The shear pins (shear portions) 83 penetrate the bracket-side connections holes 70d which are through-holes formed in the sidewall portion 70c, and their front-ends are locked in the holding plate-side connection holes 75c, which are formed in the holding plate 75. The guide plate 80 is installed between the sidewall portion 70c of the jacket bracket 70 and the jacket guide 4.

Figure 17:
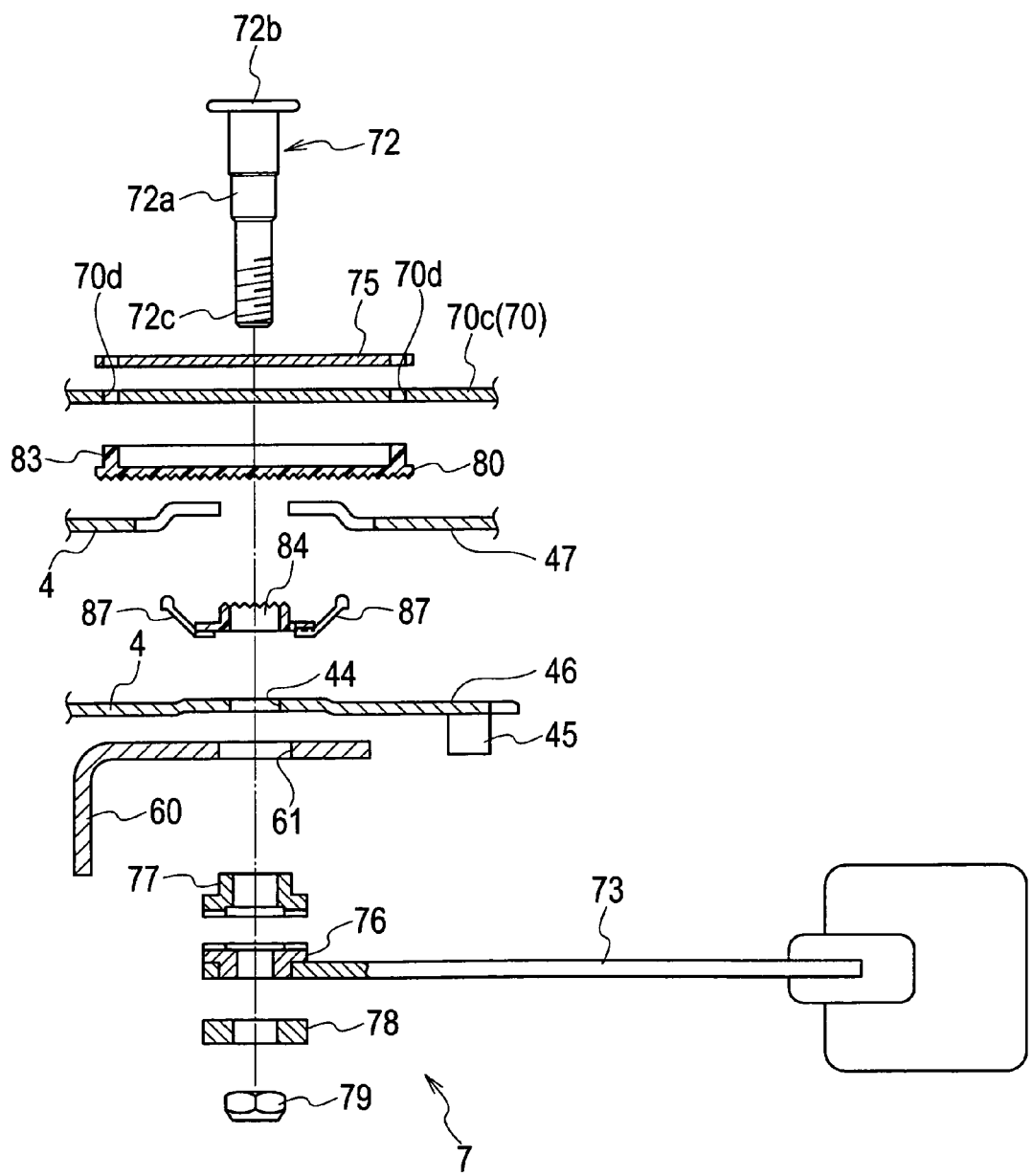
FIG. 17 shows the second embodiment of the invention, and is an exploded perspective view of a lock mechanism.
Figure 20A:
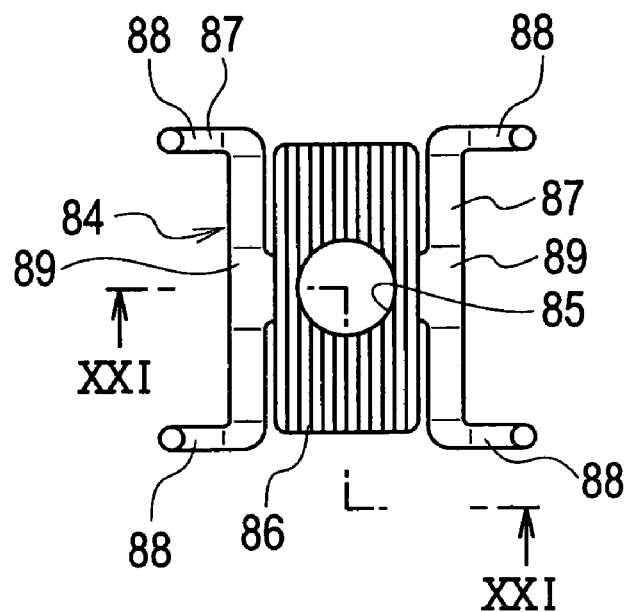
FIGS. 20A and 20B show the second embodiment of the invention, and are diagrams showing a moving-side tooth part.
Figure 20B:
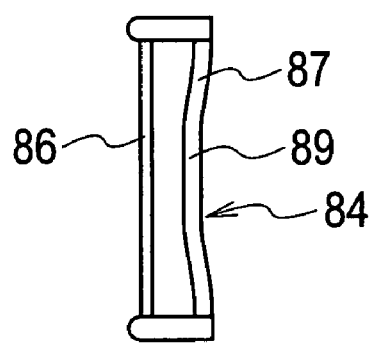
Figure 21:
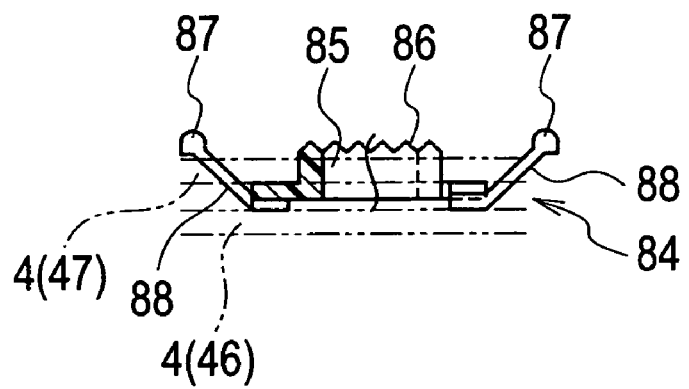
FIG. 21 shows the second embodiment of the invention, and is a cross-sectional view taken along the XXI-XXI line of FIG. 20A.

As shown in FIG. 17, the mesh piece 84 is installed between the sliding contact member 46 and the guide member 47 of the jacket guide 4 so as to be opposed to the guide plate 80. As shown in FIG. 20A and 21, a round hole 85 in which the clamp bolt 72 is inserted is formed in the mesh piece 84. In addition, moving-side tooth parts 86 are arranged in parallel on the front surface of the mesh piece 84 in the axial direction of the jacket 3. Like a rack, each moving-side tooth part 86 includes multiple tooth-shaped protrusions. The multiple tooth-shaped protrusions are formed so as to be capable of meshing with the fixed-side tooth parts 82, and extend in the direction orthogonal to the axial direction of the jacket 3. Paired spring members (biasing means) 87 are provided to the mesh piece 84. Each spring member 87 includes arm parts 88 which jut out toward the guide member 47 of the jacket guide 4, and front ends of the respective arm parts 88 are configured to abut on the guide member 47. The mesh piece 84 is biased by the paired spring members 87 in a direction away from the guide plate 80.

A connection part 89 connecting the arm parts 88 is formed in each spring member 87. The connection part 89 has a shape bend toward the center of the round hole 85 from its two sides.

Figure 22:
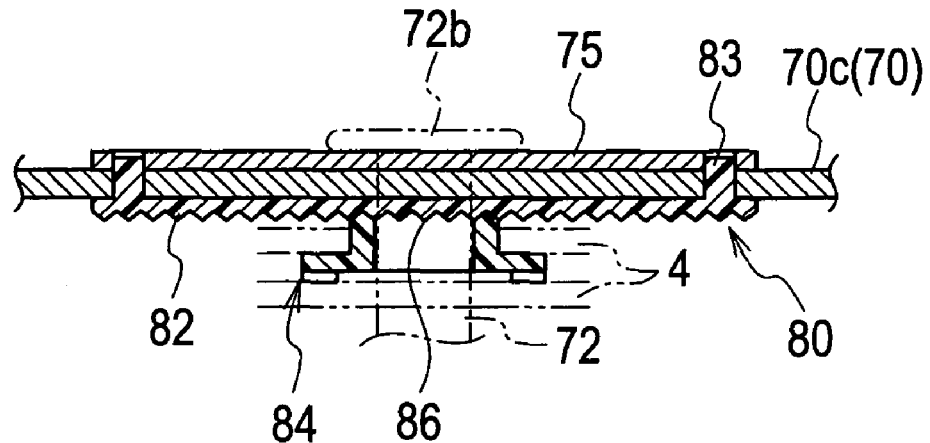
FIG. 22 shows the second embodiment of the invention, and is a cross-sectional view showing a meshed condition of the fixed-side tooth parts and the moving-side tooth part.

In the case of the foregoing configuration, once the operation lever 73 is rotated in the locking direction, the head portion 72b of the clamp bolt 72 moves in a direction away from the jacket 3. Thus, as shown in FIG. 22, the mesh piece 84 meshes with the guide plate 80, and the jacket bracket 70 is engaged with (locked to) the jacket guide 4 and the tilt bracket 60 by pressure contact. This restrains the vertical (tilt) and axial (telescopic) movements of each of the steering shaft 2 and the jacket 3. On the contrary, once the operation lever 73 is rotated in the unlocking direction, the clamp bolt 72 moves toward the jacket 3. Thus, the mesh piece 84 and the guide plate 80 are unmeshed from each other, and the mesh piece 84 is biased by the spring forces of the paired spring members 87 in a direction away from the guide plate 80. This makes the steering shaft 2 and the jacket 3 capable of moving.

Assume a case where, an excessive axial impact force in excess of a predetermined value is applied to the jacket 3 through the steering shaft 2 while the lock mechanism 7 is in a locked state, due to reasons such that the driver is hit against the steering wheel in a vehicle collision. In this case, as in the first embodiment, the steering shaft 2 and the jacket 3 move along their respective axes toward the front of the vehicle body. Thereby, the shear pins 83 of the guide plate 80 break due to the shear force. Thus, the guide plate 80 and the holding plate 75 come off the jacket bracket 70, whereas the clamp bolt 72 remains in the slit 71 of the jacket bracket 70. Thereby, the mesh piece 84 and the guide plate 80 are unmeshed from each other. In addition, the jacket bracket 70 is unclamped and released from the jacket guide 4. This makes the steering shaft 2 and the jacket 3 capable of moving in their axial directions. Thus, the steering shaft 2 and the jacket 3 contract and thus absorb the impact energy with their unillustrated energy-absorbing structures.

The second embodiment brings about the same effects as the first embodiment. Moreover, in the second embodiment, the rolled-in support portions 43a jutting out from the abutting parts 43 of the jacket guide 4 interlock with the outer edges 70e of the sliding contact portions 70a at positions on the opposite side of the sliding contact portions 70a from the abutment parts 43, respectively. In addition, the rolled-in support portions 43a are rolled toward the back side in such a way as to hold the jacket bracket 70 from two sides in the direction parallel to the shorter edges of the jacket guide 4. For these reasons, the jacket bracket 70 can be held in a manner moveable in the axial direction, and even in such a state, the jacket 3 can be prevented from coming off.

Figure 23:
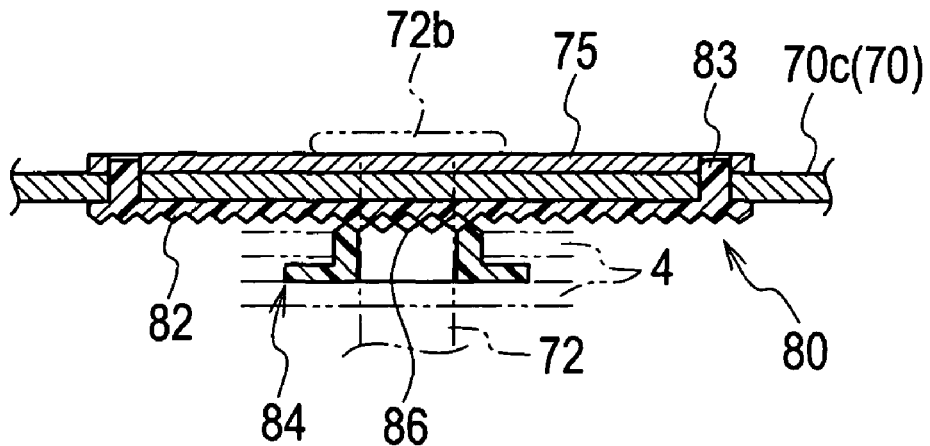
FIG. 23 shows the second embodiment of the invention, and is a cross-sectional view showing a half-locked condition of the fixed-side tooth parts and the moving-side tooth part.

In addition, according to the second embodiment, the mesh piece 84 of the lock mechanism 7 meshes with the guide plate 80. Thus, the jacket guide 4 and the guide plate 80 do not slip on each other, and the clamp bolt 72 does not travel in the detachment capsule idly. This enables the shear pins 83 to securely break with the detachment load characteristic determined beforehand. As shown in FIG. 23, if the mesh piece 84 and the guide plate 80 are half-locked together as a result of incomplete mesh between the mesh piece 84 and the guide plate 80, the connection parts 89 of the respective spring members 87 bias the mesh piece 84, and the mesh piece 84 thus slightly moves toward the jacket guide 4. This makes the jacket guide 4 and the jacket bracket 70 abut on and locked to each other, even in the half-locked condition. Thereafter, when the jacket 3 moves due to an excessive axial impact force, the mesh piece 84 and the guide plate 80 accordingly change from the half-locked condition to a fully meshed condition.

According to the second embodiment, when the lock mechanism 7 is in an unlocked state, the spring forces of the paired spring members 87 bias the mesh piece 84 in a direction away from the guide plate 80. Thus, the mesh piece 84 and the guide plate 80 are fully unmeshed from each other. This makes it possible to prevent the mesh piece 84 from getting stuck when the jacket 3 is moving in the axial direction, and enables smooth telescopic operation of the steering shaft 2.

Figure 24:
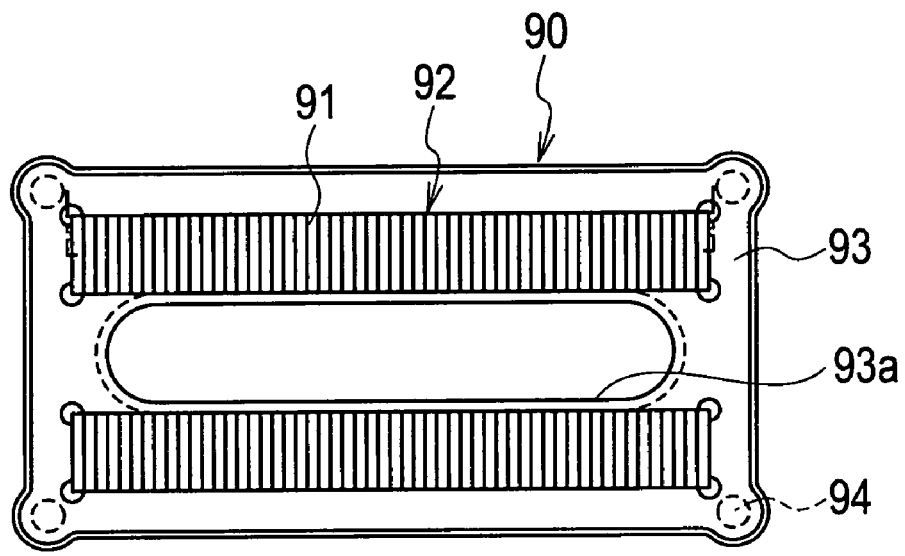
FIG. 24 shows the second embodiment of the invention, and is a front view showing a modification of the fixed-side tooth parts.
Figure 25:
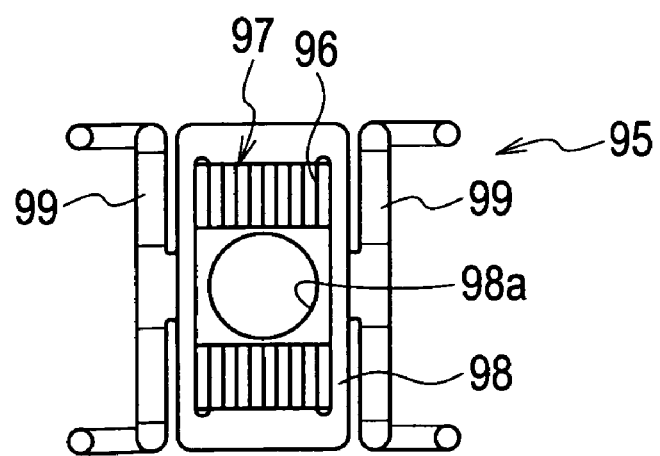
FIG. 25 shows the second embodiment of the invention, and is a front view showing a modification of the moving-side tooth part.

Note that, although the second embodiment has been illustrated as an embodiment in which the guide plate 80 is integrally molded of the resin material, the present invention is not limited to this. Instead, as shown in FIG. 24, a guide plate 90 may be formed by: molding a resin main body 93 with a metal plate 92 being inserted therein, the metal plate 92 having tooth-shaped protrusions 91 on its front surface; and then providing, in the main body 93, a telescopic long hole 93*a* in which the clamp bolt 72 is to be inserted and shear pins 94 jutting out from the rear surface of the main body 93. Similarly, instead of the mesh piece 84 integrally molded of the resin material, as shown in FIG. 25, a moving-side tooth part 95 may be formed by: molding a resin main body 98 with a metal plate 97 being inserted therein, the metal plate 97 having tooth-shaped protrusions 96 on its front surface; and then providing, in the main body 98, a round hole 98*a* in which the clamp bolt 72 is to be inserted and paired spring members 99 whose front ends abut on the guide plate 80 and which are configured to bias the mesh piece 84 in a direction away from the guide plate 80.

The foregoing embodiments have been exemplified by the structure which enables both the tilt and telescopic adjustments of the steering shaft 2. However, the same effects can be obtained in a case where the present invention is applied to a structure enabling the telescopic adjustment only, a structure enabling the tilt adjustment only, and a structure enabling neither the telescopic nor tilt adjustment.

The entire contents of Japanese Patent Application No. 2009-046768 (filed Feb. 27, 2009) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

REFERENCE SIGNS LIST 1, 1A Steering Column System
2 Steering Shaft
3 Jacket
4 Jacket Guide
43 Abutment Part
43*a* Rolled-in Support Portion
70 Jacket Bracket
70*a*, 70*b* Sliding Contact Portion
71 Slit
71*a* Opening
72*a* Shaft Portion
72 Clamp Bolt
74, 80 Guide Plate (Detachment Capsule)
74*a*, 81 Long Hole
74*b*, 83, 94 Shear Pin
82, 91 Fixed-Side Tooth Part
86, 96 Moving-Side Tooth Part
84, 95 Mesh Piece (Detachment Capsule)
87 Spring Member (Detachment Capsule)
90 Guide Plate (Main Body Portion, Detachment Capsule)
99 Spring Member (Biasing Means)

The invention claimed is:

1. A steering column system, comprising:
a mount bracket including a fixed portion and a suspended portion, the fixed portion fixed to a vehicle body, the suspended portion united with the fixed portion;
a steering shaft having a steering wheel fixed to an axially uppermost end thereof;
a jacket configured to rotatably support the steering shaft;
a jacket bracket which is integrally formed on an outer peripheral surface of the jacket and which includes a sliding contact portion and a slit, the sliding contact portion extending in an axial direction of the jacket, the slit formed so as to extend in the axial direction of the jacket and to be opened toward a rear of the vehicle body;
a jacket guide placed between the mount bracket and the jacket, the jacket guide including an abutment part which is opposed to and abuts on the sliding contact portion;
a clamp bolt which is supported by the mount bracket and which includes a shaft portion, the shaft portion penetrating the slit of the jacket bracket and the jacket guide; and
a detachment member including a restraint portion and a shear portion, the restraint portion being placed in such a way as to lie across the slit to restrain a movement range of the clamp bolt in the slit, the shear portion configured to fix the restraint portion to the jacket bracket and to be released from their connection when a force in excess of a predetermined value is applied, wherein
when the clamp bolt is fastened, the sliding contact portion is pressed to the abutment part, and the jacket is firmly clamped to and held by the mount bracket; and
when the force in excess of the predetermined value is applied to the jacket in its axial direction while the clamp bolt is being fastened, the shear portion breaks, and thereby the restraint imposed on the movement range by the restraint portion is lifted, and the jacket moves.

2. The steering column system according to claim 1, wherein:
the abutment part has a square U-shaped groove cross section, which extend in the axial direction; and
movement of the jacket is guided in the axial direction by causing the jacket bracket to slide in a square U-shaped groove between the abutment parts.

3. The steering column system according to claim 1, wherein
the detachment member includes a guide plate made of resin and a holding plate made of a plate-shaped member;
the shear portion includes a shear pin which juts out from the guide plate and which penetrates a bracket-side connection hole and a holding plate-side connection hole, the bracket-side connection hole being a through-hole formed in the jacket bracket, and the holding plate-side connection hole being formed in the holding plate; and
the restraint portion includes long holes which are respectively formed in the holding plate and the guide plate and which have a lengthwise dimension equal to a telescopic movement dimension of the jacket.

4. The steering column system according to claim 1, wherein the detachment member comprises:
- a mesh piece including:
    - an insertion hole in which the shaft portion of the clamp bolt is inserted;
    - a moving-side tooth part including a plurality of tooth-shaped protrusions being arranged in parallel like a rack, the plurality of tooth-shaped protrusions extending toward the guide plate; and
    - biasing means which is made of an elastic material and which juts out toward the main body part; and
- a fixed-side tooth part including a plurality of tooth-shaped protrusions arranged in parallel like a rack on the guide plate along the long hole in the guide plate, the fixed-side tooth part being configured to be capable of meshing with the moving-side tooth part, and wherein when the clamp bolt is fastened, the fixed-side tooth part and the moving-side tooth part mesh with each other; and when the clamp bolt is unfastened, biasing force of the biasing means make the fixed-side tooth part and the moving-side tooth part separated away from each other.

5. The steering column system according to claim 1, wherein the jacket guide comprises a rolled-in support portion which juts out in the axial direction of the jacket from an outer edge of the abutment part toward an outer edge of the sliding contact portion, and which is rolled toward a back side of the sliding contact portion in the contracted jacket.

* * * * *